US009493237B1

(12) United States Patent
Terasaka

(10) Patent No.: US 9,493,237 B1
(45) Date of Patent: Nov. 15, 2016

(54) REMOTE CONTROL SYSTEM FOR AIRCRAFT

(71) Applicant: Ryu Terasaka, Narita (JP)

(72) Inventor: Ryu Terasaka, Narita (JP)

( * ) Notice: Subject to any disclaimer, the term of this patent is extended or adjusted under 35 U.S.C. 154(b) by 0 days.

(21) Appl. No.: 15/139,333

(22) Filed: Apr. 27, 2016

(30) Foreign Application Priority Data

May 7, 2015 (JP) .................................. 2015-095116

(51) Int. Cl.
*B64C 39/00* (2006.01)
*B64C 39/02* (2006.01)
*G05D 1/00* (2006.01)
*B60R 1/00* (2006.01)
*G09B 9/02* (2006.01)
*G09B 9/12* (2006.01)
*G06F 3/01* (2006.01)
*G09B 9/10* (2006.01)
*G09B 9/16* (2006.01)

(52) U.S. Cl.
CPC .............. *B64C 39/024* (2013.01); *B60R 1/00* (2013.01); *G05D 1/0016* (2013.01); *B60R 2300/80* (2013.01); *B64C 2201/146* (2013.01); *G06F 3/011* (2013.01); *G09B 9/02* (2013.01); *G09B 9/10* (2013.01); *G09B 9/12* (2013.01); *G09B 9/165* (2013.01)

(58) Field of Classification Search
CPC . B64C 39/024; B64C 2201/146; B60R 1/00; B60R 2300/80; G05D 1/0016; G09B 9/02; G09B 9/10; G09B 9/12; G09B 9/165; G06F 3/011
USPC ........................................................... 701/2
See application file for complete search history.

(56) References Cited

U.S. PATENT DOCUMENTS

| | | | | |
|---|---|---|---|---|
| 3,270,440 A | * | 9/1966 | Radosevic, Jr. | G09B 9/14 297/DIG. 3 |
| 3,983,640 A | * | 10/1976 | Cardullo | G09B 9/10 297/284.3 |
| 4,713,007 A | * | 12/1987 | Alban | G09B 9/28 244/223 |
| 5,209,662 A | * | 5/1993 | Fujita | G09B 9/058 273/442 |
| 5,299,810 A | * | 4/1994 | Pierce | A63F 13/005 273/442 |
| 5,513,990 A | * | 5/1996 | Gluck | G09B 9/14 434/29 |

(Continued)

FOREIGN PATENT DOCUMENTS

JP   H07-210077 A   8/1995
JP   3671024 B      7/2005

OTHER PUBLICATIONS

Japanese decision to grant a patent dated Oct. 6, 2015.

*Primary Examiner* — Fadey Jabr
*Assistant Examiner* — Angelina Shudy
(74) *Attorney, Agent, or Firm* — Yokoi & Co., U.S.A.; Toshiyuki Yokoi

(57) ABSTRACT

The present invention provides a remote control system of an aircraft 1 that includes a camera 2 mounted on the aircraft 1, a monitor 4 visible from an operator 3 remote from the aircraft 1, a remote controller 5 operated by the operator 3, an acceleration sensor 6 mounted on the aircraft 1 to detect upward/downward, left/right and forward/backward accelerations, sensitive pads 7 configured to be attached to each portion of the operator 3, and a controller 8 that generates a vibration or an electrical stimulus on each of the sensitive pads 7 while a magnitude of the vibration or the electrical stimulus is changed based on an output value of the acceleration sensor 6 to make the operator 3 feel a direction and a magnitude of the acceleration generated on the aircraft 1.

3 Claims, 11 Drawing Sheets

(56) References Cited

U.S. PATENT DOCUMENTS

| | | | | |
|---|---|---|---|---|
| 5,547,382 A * | 8/1996 | Yamasaki | G09B 9/058 | 273/442 |
| 5,669,818 A * | 9/1997 | Thorner | A63F 13/02 | 463/30 |
| 6,256,397 B1 * | 7/2001 | Komatsu | H04R 9/066 | 381/333 |
| 8,241,133 B1 * | 8/2012 | Lewis | A63G 31/16 | 104/53 |
| 8,730,065 B2 * | 5/2014 | Herman | G08B 6/00 | 340/407.1 |
| 2001/0003712 A1 * | 6/2001 | Roelofs | G06F 3/011 | 463/37 |
| 2002/0115043 A1 * | 8/2002 | Baker | G09B 19/16 | 434/30 |
| 2003/0094539 A1 * | 5/2003 | Schaeffer | B64C 13/10 | 244/17.13 |
| 2005/0069839 A1 * | 3/2005 | Denne | A63F 13/08 | 434/29 |
| 2006/0284459 A1 * | 12/2006 | Real | A47C 15/004 | 297/217.3 |
| 2007/0290988 A1 * | 12/2007 | Nogami | G06F 3/016 | 345/156 |
| 2008/0100588 A1 * | 5/2008 | Nogami | G06F 3/016 | 345/173 |
| 2015/0203011 A1 * | 7/2015 | Fujita | B60N 2/68 | 297/284.11 |
| 2015/0346722 A1 * | 12/2015 | Herz | G05D 1/0038 | 701/2 |
| 2016/0117853 A1 * | 4/2016 | Zhong | G06T 11/60 | 345/634 |

* cited by examiner

Fig. 6C
Fig. 6B
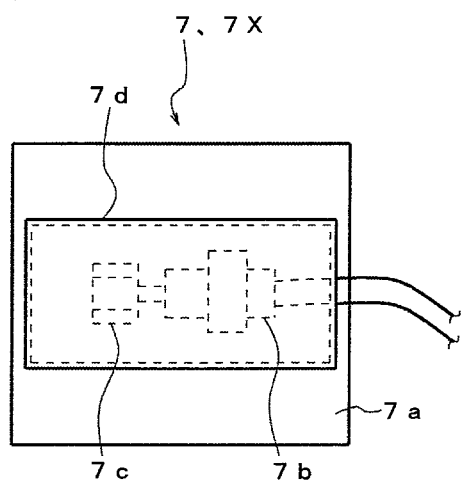
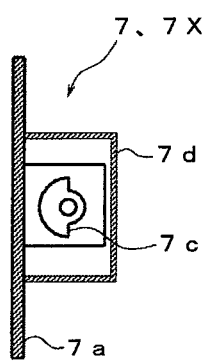
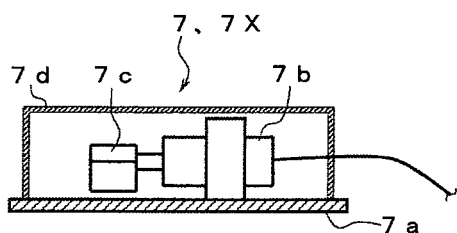
Fig. 6A

REMOTE CONTROL SYSTEM FOR AIRCRAFT

CROSS-REFERENCES TO RELATED APPLICATIONS

This patent specification is based on Japanese patent application, No. 2015-095116 filed on May 7, 2015 in the Japan Patent Office, the entire contents of which are incorporated by reference herein.

BACKGROUND OF THE INVENTION

1. Field of the Invention

The present invention relates to a remote control system for an aircraft operated from a location remote from the aircraft. In particular, the present invention relates to the remote control system for the aircraft enabling to give an operator a feeling as if the operator is on board the aircraft.

2. Description of the Related Art

As the remote control system for the aircraft, it is known that a system for remote controlling an aircraft while an operator on the ground views an image on a monitor, the image being captured by a video camera mounted on the aircraft.

For example, Patent Document 1 discloses a remote control system for an aircraft that mounts a video camera capable of changing a photographing direction up and down or right and left wherein movement of a head of the operator on the ground is detected by a sensor, the photographing direction of the video camera is changed up and down or right and left according to an output value of the sensor, and the image (moving image) is displayed on a monitor viewed by the operator.

By using the above described remote control system for the aircraft, the photographing direction of the video camera mounted on the aircraft is changed in interlocking with the movement of the operator on the ground. Thus, the operator can view the image of the desired direction according to the direction of the head. As a result, the operator on the ground can understand side views of the aircraft (own machine) in addition to a front view. Thus, the operator can easily judge an attitude condition of the own machine and operability is improved.

[Patent document 1] Japanese Patent No. 3671024
[Patent document 2] Japanese Unexamined Patent Application Publication No. H07-210077

BRIEF SUMMARY OF THE INVENTION

Since the aircraft flies upward/downward, right/left and forward/downward in a three-dimensional space in the air in various attitudes, the operator may not judge the attitude condition and the moving direction of the own machine only from visual information obtained from the image displayed on the monitor.

For example, when there are no clouds and nothing but blue sky, only blue color is displayed on the monitor. Thus, there is no scale (clue) to visually understand the attitude condition and the moving direction of the own machine in the image displayed on the monitor. The same applies when the own machine is entered into clouds. Only gray color is displayed on the monitor. In these cases, the operator cannot understand the present attitude of the own machine from the monitor, and therefore the operator cannot operate the aircraft properly. In addition, the image of the monitor does not change from only blue color or only gray color for a certain period of time in the above described cases. Therefore, the operator cannot actually realize whether the own machine is moving upward or moving downward, whether the own machine is accelerating or decelerating, and whether the own machine is turning right or turning left only from the visual information obtained from the monitor. Thus, the operator cannot remote control the aircraft properly.

In the field of a flight simulator, it is known that a seat on which the operator sits is tilted by a hydraulic cylinder to simulate an acceleration generated on the aircraft (shown in Patent Document 2). However, the seat should be tilted in all directions in order to simulate the acceleration generated on the aircraft that flies upward/downward, right/left and forward/downward in a three-dimensional space in the air in various attitudes. Accordingly, a plurality of hydraulic cylinders are arranged under the seat of the operator like a link mechanism, and the seat is tilted forward and backward or in left and right by expanding and contracting the hydraulic cylinders while being associated with each other. When constructing the remote control system for the aircraft using the above described flight simulator, a plurality of hydraulic cylinders should be arranged under the seat of the operator of operating the aircraft like a link mechanism and the seat should be tilted by expanding and contracting the hydraulic cylinders while being associated with each other. Accordingly, whole the system is inevitably complicated and highpriced.

Considering the above described problems, a purpose of the present invention is to provide a remote control system for an aircraft having a simple structure with a low price. The remote control system of the present invention makes the operator who is remote from the aircraft feel the acceleration of various directions generated on the aircraft when flying as tactile information in addition to the visual information captured by the cameras of the aircraft. Thus, the operator can realize the attitude and the flight direction of the own machine and the operator can feel as if he/she operates the aircraft while being on board the aircraft.

In order to achieve the above described purposes, the present invention provides a remote control system for an aircraft, comprising: a camera mounted on the aircraft to capture at least a front in a flight direction; a monitor to display a moving image captured by the camera, the monitor being arranged at a position visible from an operator who controls the aircraft from a location remote from the aircraft; a remote controller operated by the operator viewing the monitor, the remote controller controlling a flight direction and a flight speed of the aircraft according to an operation of the operator; an acceleration sensor mounted on the aircraft to detect upward/downward, left/right and forward/backward accelerations generated on the flying aircraft; sensitive pads configured to be attached to each of an upper projection portion, a lower projection portion, a left projection portion, a right projection portion, a front projection portion, and a rear projection portion of the operator; and a controller that generates a vibration or an electrical stimulus on the sensitive pads while a magnitude of the vibration or the electrical stimulus is changed based on an output value of the acceleration sensor to make the operator feel a direction and a magnitude of the acceleration generated on the aircraft.

The controller can actuate the sensitive pad located at the lower projection portion when the acceleration sensor detects the upward acceleration and actuate the sensitive pad located at the upper projection portion when the acceleration sensor detects the downward acceleration, the controller can actuate the sensitive pad located at the right projection portion when the acceleration sensor detects the left acceleration and actuate the sensitive pad located at the left projection portion when the acceleration sensor detects the right acceleration, and the controller can actuate the sensitive pad located at the rear projection portion when the acceleration sensor detects the forward acceleration and actuate the sensitive pad located at the front projection portion when the acceleration sensor detects the backward acceleration.

The acceleration sensor can include an angular acceleration sensor provided inside the aircraft, and the controller can include a calculation portion that calculates a moment of force generated at a cockpit position by multiplying an angular acceleration detected by the angular acceleration sensor on a distance between a position of the angular acceleration sensor and the cockpit position of the aircraft to adjust a magnitude of the vibration or the electrical stimulus of the sensitive pads according to the moment calculated by the calculation portion.

The camera can include a front camera that captures the front in the flight direction, a right camera that captures a right in the flight direction, a left camera that captures a left in the flight direction, and an upper camera that captures an upper side in the flight direction, and the monitor can include a front monitor that is arranged at a front of the operator to display the moving image captured by the front camera, a right monitor that is arranged at a right of the operator to display the image captured by the right camera, a left monitor that is arranged at a left of the operator to display the moving image captured by the left camera, and an upper monitor that is arranged at an upper side of the operator to display the moving image captured by the upper camera.

The following effects can be obtained from the remote control system for the aircraft of the present invention.

(1) The operator who is remote from the aircraft can realize the attitude and the flight direction of the aircraft by making the operator feel the acceleration of various directions generated on the aircraft when flying as the tactile information in addition to the visual information captured by the cameras of the aircraft.

Accordingly, the operator who is remote from the aircraft can feel as if he/she operates the aircraft while being on board the aircraft. Thus, operatively is improved.

(2) As a means for making the operator feel the acceleration of various directions generated on the aircraft as the tactile information, sensitive pads configured to be attached to each of the upper projection portion, the lower projection portion, the left projection portion, the right projection portion, the front projection portion, the rear projection portion of the operator are used and the acceleration is simulated by generating the vibration or the electrical stimulus on the sensitive pads while a magnitude of the vibration or the electrical stimulus is changed at an appropriate timing. Accordingly, whole the system can be configured simply and at a low cost when compared, for example, to the system of simulating the acceleration by inclining the seat of the operator using a plurality of hydraulic cylinders.

BRIEF DESCRIPTION OF THE DRAWINGS

" FIG. 3A is a side view, FIG. 3B is a front view, and FIG. 3C is a plan view.

FIG. 5A is a front view, FIG. 5B is a plan view, and FIG. 5C is a side view.

FIGS. 6A to 6C are explanation drawings showing an example (vibration-type) of a "sensitive pad" constituting a part of the "remote control system for aircraft." FIG. 6A is a lateral cross-sectional view, FIG. 6B is a plan view, and FIG. 6C is a front cross- sectional view.

" FIG. 7A is a circuit diagram and FIG. 7B is an explanation drawing showing a relation between a reproduction signal of the acceleration G and a motor rotation speed.

" FIG. 8A is a lateral cross-sectional view, FIG. 8B is a plan view, and FIG. 8C is a front cross-sectional view.

" FIG. 9A is a circuit diagram and FIG. 9B is an explanation drawing showing a relation between a reproduction signal of the acceleration G and a pulse output signal.

DETAILED DESCRIPTION OF THE INVENTION

Hereafter, the preferable embodiment of the present invention will be explained in detail with reference to the drawings. Dimensions, materials and other specific values shown in the embodiment are merely examples for helping the understanding of the invention and do not limit the present invention unless otherwise specifically noted. In the specification and the drawings, the same symbols are assigned to the elements having substantially same function and configuration, and redundant explanations are omitted. The illustration of the elements not directly related to the present invention is omitted.

(Summary of Remote Control System for Aircraft)

Figure 1:
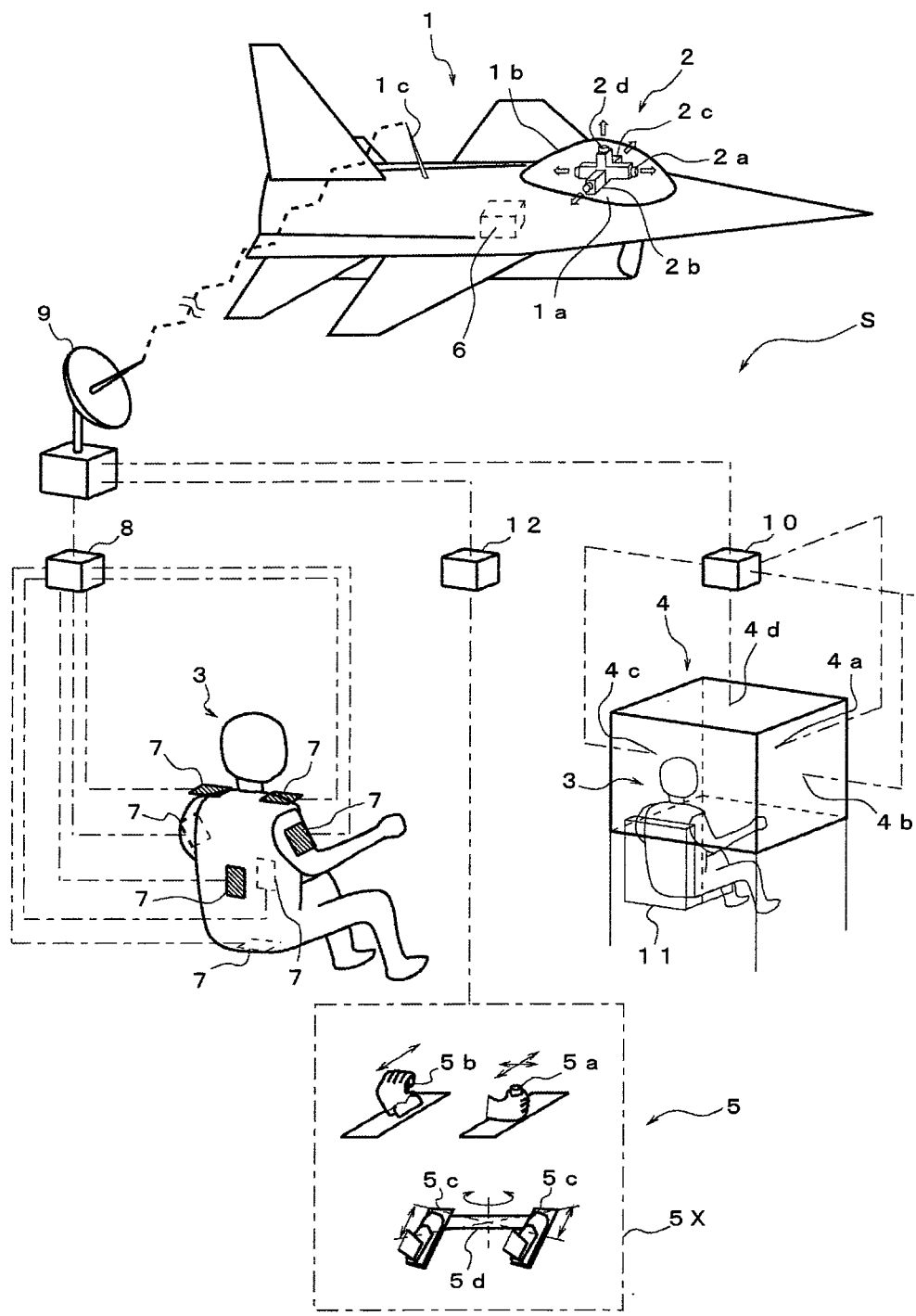
FIG. 1 is an explanation drawing showing an outline of a "remote control system for aircraft" concerning one embodiment of the present invention.
Figure 2:
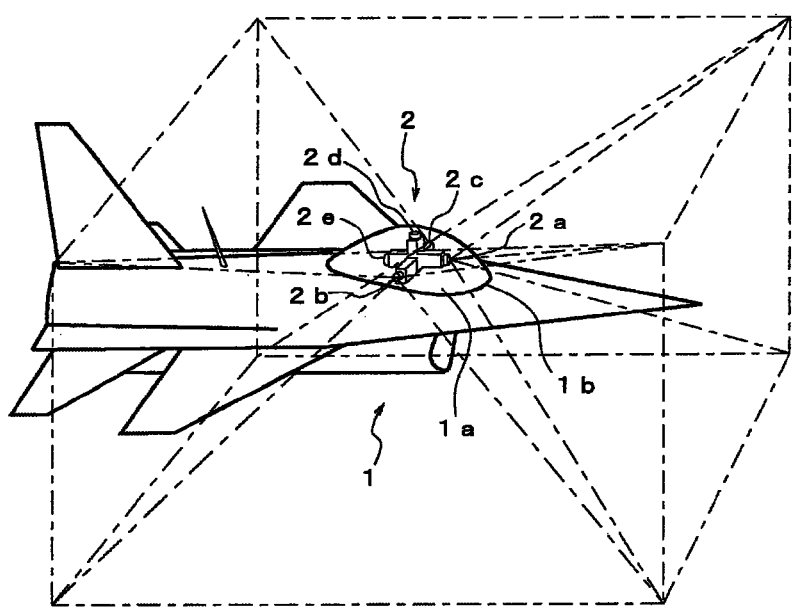
FIG. 2 is a perspective view showing a "camera" constituting a part of the "remote control system for aircraft" and a photographing range of the "camera".

FIG. 1 shows a summary of a "remote control system for aircraft" S of one embodiment of the present invention. The remote control system for aircraft S of the present embodiment includes: a camera 2 mounted on an aircraft 1 to capture at least a front in a flight direction; a monitor 4 to display a moving image captured by the camera 2, the monitor 4 being arranged at a position visible from an operator 3 who controls the aircraft 1 from a location remote from the aircraft 1; and a remote controller 5 operated by the operator 3 viewing the monitor 4, the remote controller 5 controlling a flight direction and a flight speed of the aircraft 1 according to an operation of the operator 3.

The remote control system for aircraft S of the present embodiment also includes: an acceleration sensor 6 mounted on the aircraft 1 to detect upward/downward, left/right and forward/backward accelerations generated on the flying aircraft 1; sensitive pads 7 configured to be attached to each of an upper projection portion, a lower projection portion, a left projection portion, a right projection portion, a front projection portion, and a rear projection portion of the operator 3; and a controller 8 that generates a vibration or an electrical stimulus on the sensitive pads 7 while a magnitude of the vibration or the electrical stimulus is changed based on an output value of the acceleration sensor 6 to make the operator 3 feel a direction and a magnitude of the acceleration generated on the aircraft 1. Hereafter, each of the components of the "remote control system for aircraft" S of the present embodiment will be explained.

(Aircraft 1)

As shown in FIG. 1, a concept of the aircraft 1 operated by the above described remote control system S includes normal airplanes such as a propeller plane and a jet plane, and other objects flying (moving) in a space such as a rotorcraft (e.g. helicopter), a glider and an airship. In the present specification, in addition to the actual machine, the concept of the aircraft 1 also includes a so-called radio-controlled plane which is popular as a hobby.

(Camera 2)

As shown in FIG. 1, a camera 2 is mounted on the aircraft 1. In the present embodiment, the camera 2 is attached to a cockpit 1a of the aircraft 1 to be located inside a canopy 1b. Because of this, the image captured by the camera 2 can reproduce a visual field viewed by the operator sit on the cockpit 1a through the canopy 1b. In addition, the camera 2 covered by the canopy 1b does not increase air resistance. In the radio-controlled plane, the camera 2 may not be attached inside the canopy 1b in some cases due to a problem of space. In this case, for example, the camera 2 is mounted immediately above a gravity center of a machine body of the aircraft 1, and a counter weight is placed on an opposite side of the camera 2 across the gravity center of the machine body so that the moment of the weight of the camera 2 is canceled by the counter weight. Thus, an influence of the weight of the camera 2 affected on maneuverability of the aircraft 1 can be minimized.

As shown in FIG. 2 and FIGS. 3A to 3C, the camera 2 includes a front camera 2a that captures (photographs) the front in the flight direction, a right camera 2b that captures a right in the flight direction, a left camera 2c that captures a left in the flight direction, and an upper camera 2d that captures an upper side in the flight direction of the aircraft 1. Note that a rear camera 2e that captures a rear in the flight direction can be added. The cameras 2a to 2e are arranged at right angles with each other. A visual angle (field angle) of the cameras 2a to 2e is approximately 90°. Thus, the visual field viewed from the cockpit 1a through the canopy 1b can be captured seamlessly by the cameras 2a to 2e.

Figure 3C:
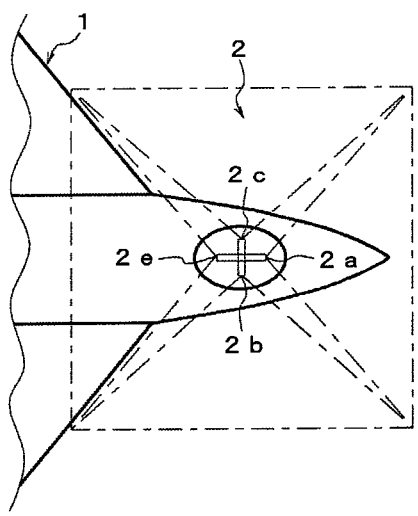
FIGS. 3A to 3C are explanations drawings showing the photographing range of the "camera.
Figure 3A:
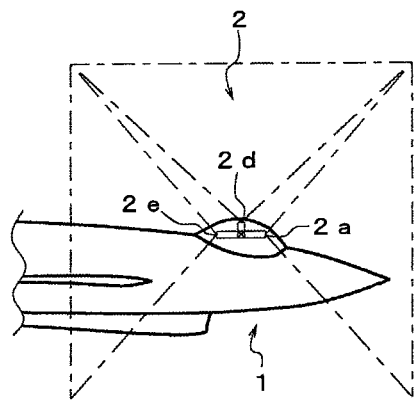
Figure 3B:
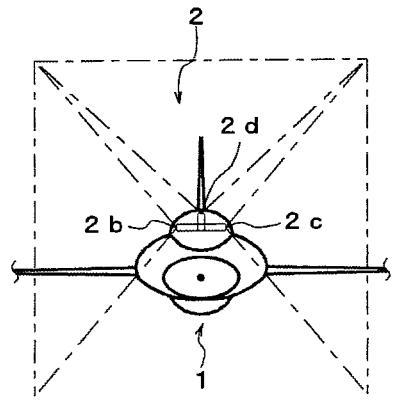

In FIGS. 3A to 3C, a photographing distance of the cameras 2a to 2e is short in the drawings for convenience in making drawings, and the visual angle of the cameras 2a to 2e becomes more than 90° because of the slight difference of the positions of lenses of the cameras 2a to 2e. However, the photographing distance (several kilometers) of the cameras 2a to 2e is actually extremely long compared to the difference (several centimeters) of the positions of the lenses of the cameras 2a to 2e. Accordingly, there is actually no problem if the view angle of the cameras 2a to 2e is specified to 90°. Alternatively, the view angle of the cameras 2a to 2e can be specified to 90° or more (approximately 90 to 100°, e.g., 95°) to reproduce continuous visual field on the monitor 4 by processing the image of the overlapped part.

(Monitor 4)

As shown in FIG. 1, at a location (e.g., the ground) remote from the aircraft 1, a monitor 4 to display a moving image captured by the camera 2 is arranged at a position visible from the operator 3. Here, the concept "location remote from the aircraft 1" includes not only the ground but also other locations such as on shipboard or on the other aircraft (the aircraft different from the remote-controlled aircraft 1). The data of the moving image captured by the camera 2 is transmitted from an antenna 1c provided on the aircraft 1 to a relay antenna 9 provided on the location remote from the aircraft 1, then transmitted from the relay antenna 9 to an image control device 10, and then transmitted from the image control device 10 to the monitor 4.

The monitor 4 includes a front monitor 4a that is arranged at a front of the operator 3 to display the moving image captured by the front camera 2a, a right monitor 4b that is arranged at a right of the operator 3 to display the image captured by the right camera 2b, a left monitor 4c that is arranged at a left of the operator 3 to display the moving image captured by the left camera 2c, and an upper monitor 4d that is arranged at an upper side of the operator 3 to display the moving image captured by the upper camera 2d. When the rear camera 2e is added, a rear monitor is added to a rear of the operator 3 to display the moving image captured by the rear camera 2e.

Each of the monitors 4a to 4d is formed by a liquid crystal panel or an organic EL panel, for example. A size of each of the monitors 4a to 4d is approximately 40 to 50 inches. When the rear monitor is added, the monitors 4a to 4d are assembled into a box shape (cuboid shape) having an opening downward. When the rear monitor is omitted, the monitors 4a to 4d are assembled into a box shape having an opening downward and backward. At least a head of the operator 3 is inserted into the box formed by the monitors 4a to 4d from the opening of the box. A curved panel can be used for each of the monitors 4a to 4d to form a spherical shape (dome shape) as a whole when the monitors 4a to 4d are connected with each other. A seat 11 is arranged below the box formed by the monitors 4a to 4d so that the operator 3 is sit on the seat.

(Remote controller 5)

As shown in FIG. 1, a remote controller 5 operated by the operator viewing the monitor 4 is provided on the location remote from the aircraft 1. The remote controller controls a flight direction and a flight speed of the aircraft 1 according to an operation of the operator 3. The remote controller 5 shown in FIG. 1 is a remote controller 5X simulating a controller of an actual machine. In this case, the actual machine is preferably used as the aircraft 1. However, the radio-controlled plane can be also used. A control signal is transmitted from the controller 5X to the relay antenna 9 via a control signal controller 12, and then transmitted from the relay antenna 9 to the antenna 1c of the aircraft 1.

The controller 5X shown in FIG. 1 includes a right lever 5a gripped by the right hand of the operator 3, a left lever 5b gripped by the left hand of the operator 3, and left/right pedals 5c on which both feet of the operator 3 are placed. A horizontal tail of the aircraft 1 is moved by moving the right lever 5a forward and backward to control the pitch. Ailerons of the aircraft 1 is moved by moving the right lever 5a left and right to control the roll. The thrust of the aircraft 1 is controlled by moving the left lever 5b forward and backward. A vertical tail of the aircraft 1 is moved by moving the left/right pedals 5c forward and backward alternately to rotate a connecting member 5d, which connects between the left/right pedals 5c, and control the yaw. Note that the remote controller 5 is not limited to the remote controller 5X shown in FIG. 1. Various types of controllers used in the actual machine can be simulated.

Figure 4:
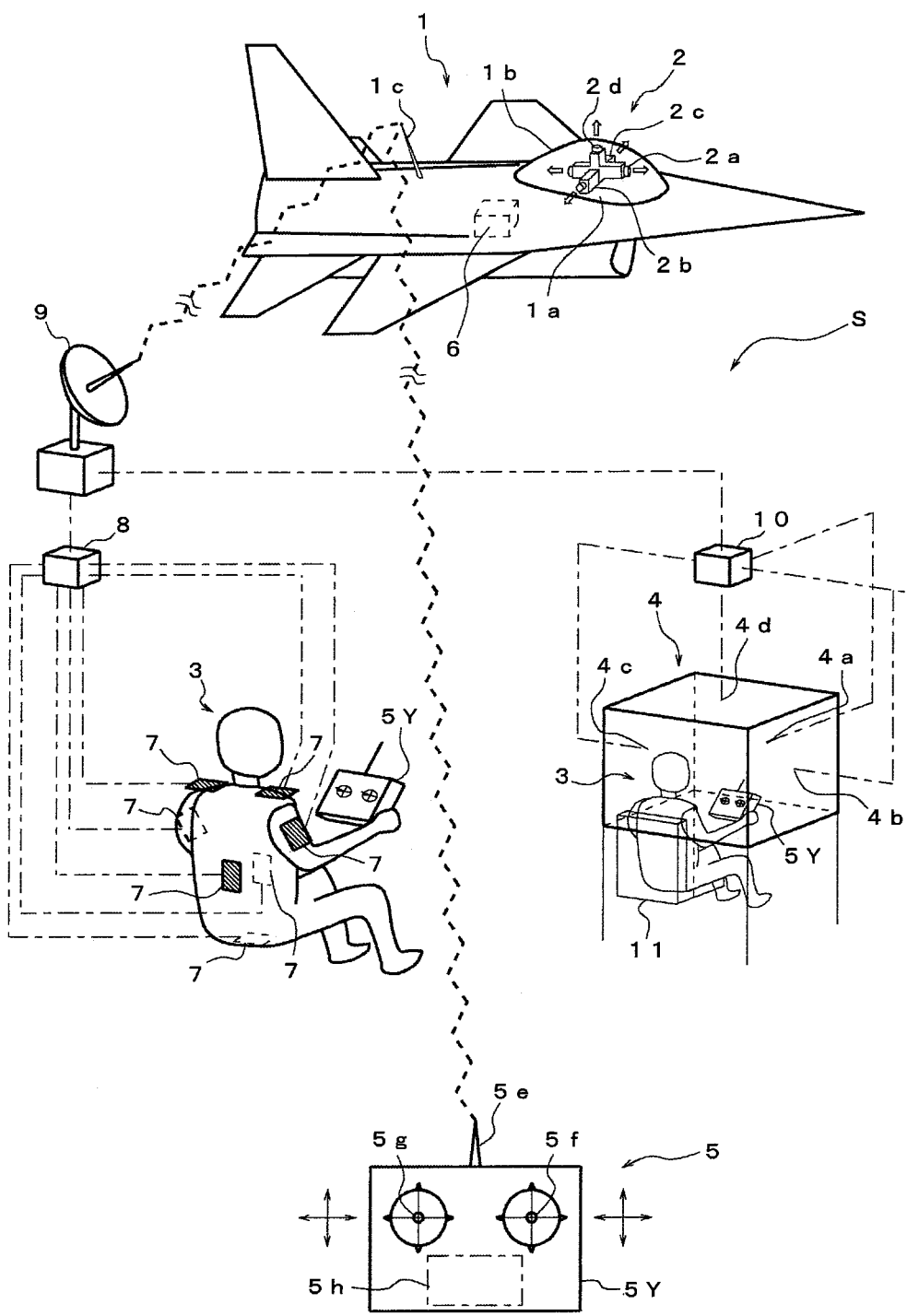
FIG. 4 is an explanation drawing showing a variation example of the "remote controller" constituting a part of the "remote control system for aircraft."

As shown in FIG. 4, a so-called proportional transmitter (wireless controller) 5Y, which is used for remote controlling the radio-controlled plane, can be used for the remote controller 5. In this case, the radio-controlled plane is preferably used as the aircraft 1. However, the actual machine can be also used. The control signal of the proportional transmitter 5Y is directly transmitted from an antenna 5e of the proportional transmitter 5Y to the antenna 1c of the aircraft 1 in FIG. 4. However, same as the type of FIG. 1, the control signal can be transmitted to the control signal controller 12 once, and then transmitted to the aircraft 1 via the relay antenna 9. As shown in FIG. 4, if the proportional transmitter 5Y held by the operator 3 is housed in the box formed by the monitors 4a to 4d, the control signal may not be transmitted from the antenna 5e of the proportional transmitter 5Y to the aircraft 1 by electromagnetic shielding. Accordingly, it is preferred that the antenna 5e of the proportional transmitter 5Y is extended or bent so as to be arranged outside the box formed by the monitors 4a to 4d or a relay antenna is separately provided.

The proportional transmitter 5Y shown in FIG. 4 includes a right stick 5f freely tilted forward/backward and right/left, and a left stick 5g freely tilted same as the left stick 5f. A horizontal tail of the aircraft 1 is moved by moving the left stick 5g forward and backward to control the pitch. A vertical tail of the aircraft 1 is moved by moving the left stick 5g left and right to control the yaw. The thrust of the aircraft 1 is controlled by moving the right stick 5f forward and backward. Ailerons of the aircraft 1 is moved by moving the right stick 5f left and right to control the roll. The operations of the sticks of the proportional transmitter 5Y when adjusting the steering and thrust of the aircraft 1 are not limited to the above described patterns. A setting of the proportional transmitter 5Y can be changed so that different operations of sticks are assigned to adjust the steering and thrust.

As shown by a virtual line on an upper surface of the proportional transmitter 5Y in FIG. 4, a small monitor 5h (monitor displaying the image of the front camera 2a) can be provided so that the operator 3 operates the proportional transmitter 5Y while viewing the monitor 5h. I this case, the front monitor 4a, the right monitor 4b, the left monitor 4c, the upper monitor 4d shown in FIG. 4 and the rear monitor are not required. In addition, the right camera 2b, the left camera 2c, the upper camera 2d and the rear camera 2e are not required.

(Acceleration Sensor 6)

As shown in FIG. 1 and FIG. 4, an acceleration sensor 6 is mounted on the aircraft 1 to detect upward/downward, left/right and forward/backward accelerations generated on the flying aircraft 1. An output value of the acceleration sensor 6 is transmitted from the antenna 1c provided on the aircraft 1 to the relay antenna 9 provided on the location remote from the aircraft 1, then transmitted from the relay antenna 9 to a controller (control portion) 8 of the reproduction signal of acceleration. The controller 8 generates the reproduction signal of acceleration (reproduction signal of acceleration G) based on the output value of the acceleration sensor 6, and then transmits the reproduction signal of acceleration G to the sensitive pads 7.

As the acceleration sensor 6, a three-axis acceleration sensor can be used, for example. The three-axis acceleration sensor can measure acceleration in three directions: X-axis, Y-axis and Z-axis directions by one device. Here, the X-axis means an axis in the forward/backward direction of the aircraft 1, the Y-axis means an axis in the left/right direction of the aircraft 1, and the Z-axis means an axis in the upward/downward direction of the aircraft 1. As the three-axis acceleration sensor 6, an oscillation-type using MEMS (Micro Electro Mechanical Systems), an optical-type, and a semiconductor-type (electrostatic capacitance-type, piezo resistance-type, gas temperature distribution-type) are known, for example. Either of the types can be used. The three-axis acceleration sensor 6 is preferably provided at the position of the cockpit 1a located inside the canopy 1b of the aircraft 1 or a surrounding area. This is because the acceleration applied to the operator sit in the cockpit 1a can be measured.

Figure 5A:
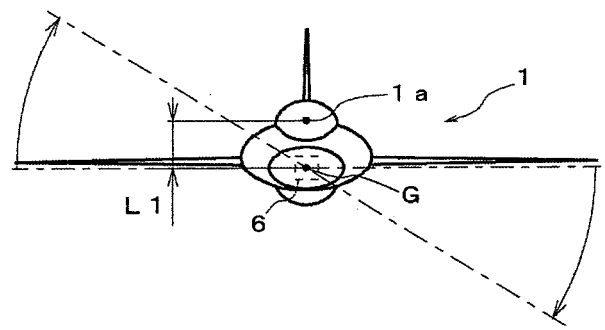
FIGS. 5A to 5C are explanation drawings using an "angular acceleration sensor" as the "acceleration sensor" constituting a part of the "remote control system for aircraft" and showing a relation between a mounting position of the "angular acceleration sensor" mounted on the aircraft and a cockpit.
Figure 5B:
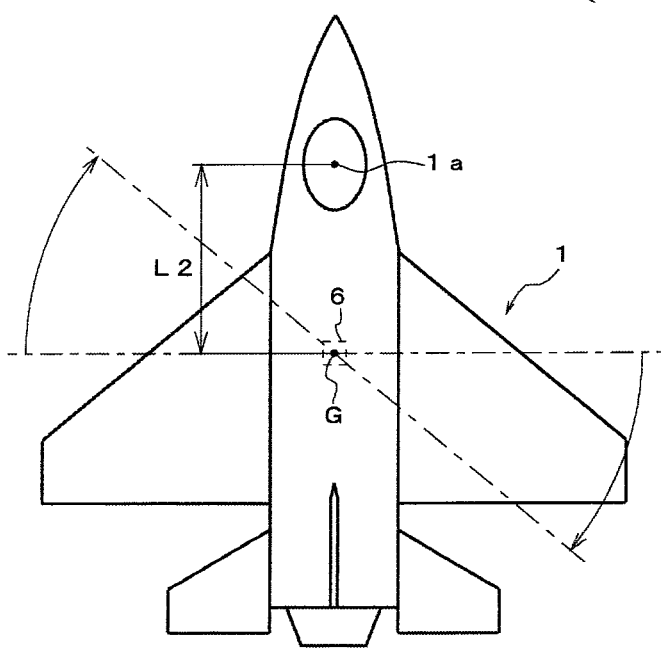
Figure 5C:
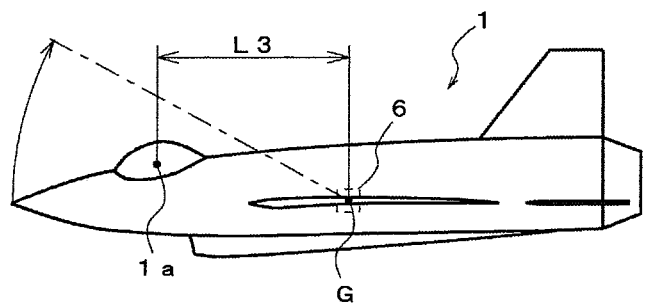

As the acceleration sensor 6, a three-axis angular acceleration sensor (three-axis gyro sensor) can be used. The three-axis gyro sensor can measure an angular acceleration around the X-axis, an angular acceleration around the Y-axis and an angular acceleration around the Z-axis by one device. As shown in FIGS. 5A to 5C, the three-axis gyro sensor 6 is provided at a gravity center G of the aircraft 1 to minimize an influence of the weight of the three-axis gyro sensor 6 affected on maneuverability the aircraft 1. By using the above described configuration, a roll moment, a yaw moment and a pitch moment around the gravity center G generated at the cockpit 1a can be calculated by multiplying the angular acceleration around each axis detected by the three-axis gyro sensor 6 respectively on a distance between the gravity center G and the position of the cockpit 1a of the aircraft 1.

More specifically, as shown in FIG. 5A, the roll moment (rolling moment) generated at the cockpit 1a can be calculated by multiplying the angular acceleration around the X-axis detected by the three-axis gyro sensor 6 on a distance L1 between the gravity center G and the position of the cockpit 1a when the aircraft 1 is seen from the front. As shown in FIG. 5B, the yaw moment (yawing moment) generated at the cockpit 1a can be calculated by multiplying the angular acceleration around the Z-axis detected by the three-axis gyro sensor 6 on a distance L2 between the gravity center G and the position of the cockpit 1a when the aircraft 1 is seen from the above. As shown in FIG. 5C, the pitch moment (pitching moment) generated at the cockpit 1a can be calculated by multiplying the angular acceleration around the Y-axis detected by the three-axis gyro sensor 6 on a distance L3 (=L2) between the gravity center G and the position of the cockpit 1a when the aircraft 1 is seen from the side.

(Sensitive Pad 7)

As shown in FIG. 1 and FIG. 4, sensitive pads 7 are attached to each of an upper projection portion, a lower projection portion, a left projection portion, a right projection portion, a front projection portion, and a rear projection portion of the operator 3. On the sensitive pads 7, a vibration or an electrical stimulus is generated while a magnitude of the vibration or the electrical stimulus is changed based on an output value of the above described acceleration sensor 6 (three-axis acceleration sensor, three-axis gyro sensor) to make the operator 3 feel (perceive) a direction and a magnitude of the acceleration generated on the cockpit 1a of the aircraft 1 as a tactile information.

The upper projection portion of the operator 3 means a part of the operator 3 that can be seen from the above when the operator 3 is sit on the seat 11 located near the monitor 4. For example, the upper projection portion can be an upper portion of the left and right shoulders, an upper portion of the left and right thighs and a top of the head. In FIG. 1 and FIG. 4, the sensitive pads 7 are attached on the upper portion of the left and right shoulders of the operator 3 as an example. However, the sensitive pads 7 can be additionally attached on the upper portion of the left and right thighs and the top of the head. The lower projection portion of the operator 3 means a part of the operator 3 that can be seen from the below when the operator 3 is sit on the seat 11. For example, the lower projection portion can be a lower portion of the buttocks and a lower portion of the left and right thighs. In FIG. 1 and FIG. 4, the sensitive pad 7 is attached on the lower portion of the buttocks of the operator 3 as an example. However, the sensitive pads 7 can be additionally attached on the lower portion of the left and right thighs.

The left projection portion of the operator 3 means a part of the operator 3 that can be seen from the left when the operator 3 is sit on the seat 11. For example, the left projection portion can be a left side face of the left upper arm and a left side face of the body. In FIG. 1 and FIG. 4, the sensitive pad 7 is attached on the left side face of the left upper arm of the operator 3 as an example. However, the sensitive pads 7 can be additionally attached on the left side face of the body. The right projection portion of the operator 3 means a part of the operator 3 that can be seen from the right when the operator 3 is sit on the seat 11. For example, the right projection portion can be a right side face of the right upper arm and a right side face of the body. In FIG. 1 and FIG. 4, the sensitive pad 7 is attached on the right side face of the right upper arm of the operator 3 as an example. The sensitive pads 7 can be additionally attached on the right side face of the body.

The front projection portion of the operator 3 means a part of the operator 3 that can be seen from the front when the operator 3 is sit on the seat 11. For example, the front projection portion can be the belly or the chest of the body and the forehead of the head. In FIG. 1 and FIG. 4, the sensitive pad 7 is attached on the belly of the body of the operator 3 as an example. However, the sensitive pads 7 can be additionally attached on the chest of the body and the forehead of the head. The rear projection portion of the operator 3 means a part of the operator 3 that can be seen from the rear when the operator 3 is sit on the seat 11. For example, the rear projection portion can be the back side of the body and the back of the head. In FIG. 1 and FIG. 4, the sensitive pad 7 is attached on the back side of the body of the operator 3 as an example. However, the sensitive pads 7 can be additionally attached on the back of the head.

(Configuration of Sensitive Pad 7: Vibration Type)

As the sensitive pad 7, a vibration-type sensitive pad 7X or an electrical stimulation-type sensitive pad 7Y is used. FIGS. 6A to 6C show a configuration of the vibration-type sensitive pad 7X. The vibration-type sensitive pad 7X includes a base plate 7a freely bendable along the surface of the body of the operator 3, a motor 7b mounted on the base plate 7a, an eccentric weight 7c mounted on a rotation shaft of the motor 7b, and a cover 7d attached to the base plate 7a to cover the motor 7b and the eccentric weight 7c. The base plate 7a is detachably attached to a predetermined position of the operator 3 via a double-sided tape, MAGICTAPE (registered trademark) or the like.

When the motor 7b is rotated, the vibration is imparted to the base plate 7a by the rotation of the eccentric weight 7c. Thus, the operator 3 feels (perceives) the vibration at the position where the sensitive pad 7X is attached. If the rotation speed of the motor 7b is increased, the vibration felt by the operator 3 becomes large. If the rotation speed of the motor 7b is reduced, the vibration felt by the operator 3 becomes small. The acceleration generated on the flying aircraft 1 is simulated by the above described vibration. Namely, the present embodiment makes the operator 3 feel a direction and a magnitude of the acceleration generated on the flying aircraft 1 as a tactile information by the presence or absence and the magnitude of the vibration of each of the sensitive pads 7X attached to various portions of the operator 3.

(Control Portion 8)

As shown in FIG. 1 and FIG. 4, the sensitive pads 7 (7X) attached to each portion of the operator 3 are connected to the controller 8 so that the presence or absence and the magnitude of the vibration are controlled by the controller 8. The controller 8 generates the reproduction signal of the acceleration (reproduction signal of acceleration G) based on the output value of the acceleration sensor 6 mounted on the aircraft, transmits the reproduction signal of acceleration G to the sensitive pads 7 (7X) attached to each portion of the operator 3, and generates the vibration on each of the sensitive pads 7 (7X) while a magnitude of the vibration is changed. Thus, the controller 8 has a function of making the operator feel the direction and the magnitude of the acceleration generated on the aircraft 1 as a tactile information.

Figure 7A:
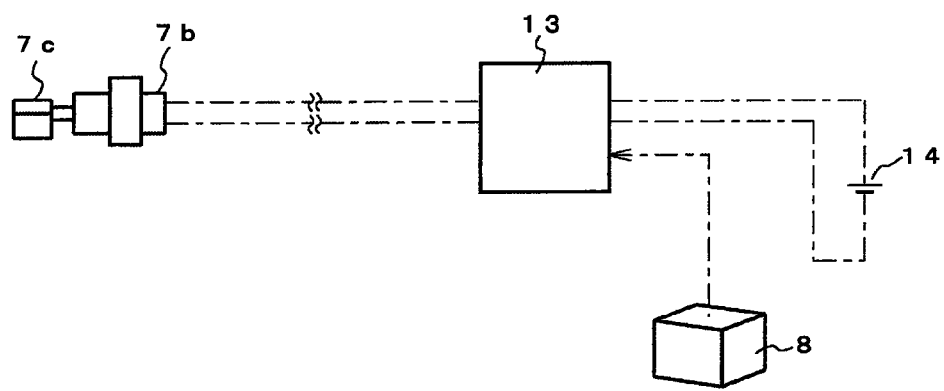
FIGS. 7A and 7B are explanation drawings for driving a motor vibrating the "sensitive pad.
Figure 7B:
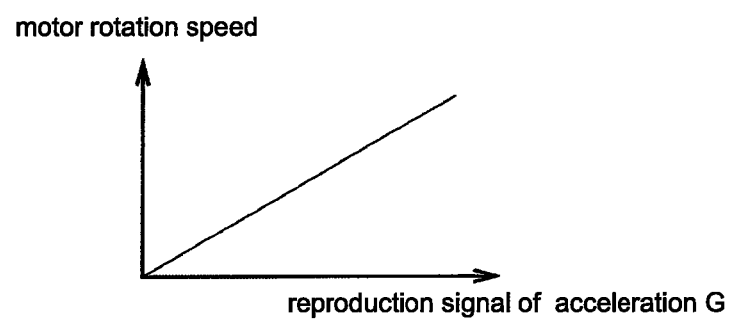

As shown in FIG. 7A, the motor 7b of each of the sensitive pads 7X is connected to a motor controller 13, the motor controller 13 is connected to a power source 14 for driving the motor, and the reproduction signal of acceleration G is input from the controller 8 to the motor controller 13. As shown in FIG. 7B, the motor controller 13 controls the rotation speed of the motor 7b proportional to the magnitude of the reproduction signal of acceleration G. Accordingly, when the reproduction signal of acceleration G is increased, the rotation speed of the motor 7b increases and the vibration generated on the sensitive pads 7X becomes large. Thus, the operator 3 can feel that large acceleration is generated on the aircraft 1. On the contrary, when the reproduction signal of acceleration G is reduced, the rotation speed of the motor 7b decreases and the vibration generated on the sensitive pads 7X becomes small. Thus, the operator 3 can feel that small acceleration is generated on the aircraft 1.

(Control of Each of Sensitive Pads 7 Controlled by Controller 8)

The controller 8 shown in FIG. 1 and FIG. 4 actuates the sensitive pad 7 located at the lower projection portion when the acceleration sensor 6 (three-axis acceleration sensor) mounted on the aircraft detects the upward acceleration, actuates the sensitive pad 7 located at the upper projection portion when the acceleration sensor 6 detects the downward acceleration, actuates the sensitive pad 7 located at the right projection portion when the acceleration sensor 6 detects the left acceleration, actuates the sensitive pad 7 located at the left projection when the acceleration sensor 6 detects the right acceleration, actuates the sensitive pad 7 located at the rear projection when the acceleration sensor 6 detects the forward acceleration, and actuates the sensitive pad 7 located at the front projection portion when the acceleration sensor 6 detects the backward acceleration.

Assuming that the operator 3 is on board the aircraft 1, when the acceleration sensor 6 detects the upward acceleration, the operator 3 is pushed to a seat surface of the seat 11 by an inertial force. Accordingly, the sensitive pad 7 located at the lower projection portion (lower portion of the buttocks) of the operator 3 is vibrated so as to make the operator 3 who remote controls the aircraft 1 feel that the aircraft (own machine) 1 starts to go upward. When the acceleration sensor 6 detects the downward acceleration, the sensitive pads 7 located at the upper projection portion (upper portion of the shoulders) of the operator 3 are vibrated so as to make the operator 3 who remote controls the aircraft 1 feel that the own machine 1 starts to go downward.

When the acceleration sensor 6 detects the left acceleration, the operator 3 is pushed to the right of the seat 11 by an inertial force. Accordingly, the sensitive pad 7 located at the right projection portion (right upper arm) of the operator 3 is vibrated so as to make the operator 3 who remote controls the aircraft 1 feel that the own machine 1 starts to turn left. When the acceleration sensor 6 detects the right acceleration, the sensitive pad 7 located at the left projection portion (left upper arm) of the operator 3 is vibrated so as to make the operator 3 who remote controls the aircraft 1 feel that the own machine 1 starts to turn right.

When the acceleration sensor 6 detects the forward acceleration, the operator 3 is pushed to a backrest of the seat 11 by an inertial force. Accordingly, the sensitive pad 7 located at the rear projection portion (back of the body) of the operator 3 is vibrated so as to make the operator 3 who remote controls the aircraft 1 feel that the own machine 1 starts to speed up. When the acceleration sensor 6 detects the backward acceleration, the sensitive pad 7 located at the front projection portion (belly of the body) of the operator 3 is vibrated so as to make the operator 3 who remote controls the aircraft 1 feel that the own machine 1 starts to speed down.

Practically, according to the flying state of the flying aircraft 1, the acceleration is generated in all directions, upward/downward, left/right and forward/backward directions, while being overlapped with each other and having different magnitude, and the magnitude of the acceleration of each direction is momentarily changed. Accordingly, the sensitive pads 7 attached to each portion of the operator 3 is vibrated to simulate the momentarily changing magnitude of the acceleration.

(In Case of Three-Axis Gyro Sensor)

In case of using the three-axis gyro sensor as the acceleration sensor 6, as shown in FIGS. 5A to 5C, a calculation portion of the controller 8 calculates a roll moment, a pitch moment and a yaw moment around the gravity center G generated at the cockpit 1a by multiplying the angular acceleration around each axis detected by the three-axis gyro sensor 6 respectively on distances L1, L2 and L3 between the gravity center G of the aircraft 1 on which the three-axis gyro sensor 6 is mounted and the position of the cockpit 1a of the aircraft 1. The controller 8 actuates (vibrates) the sensitive pad 7 attached to each portion of the operator 3 at an appropriate timing based on the calculated roll moment, pitch moment and yaw moment to make the operator 3 feel the acceleration generated on the aircraft 1 as a tactile information.

Assuming that the operator 3 is on board the aircraft 1, when the pitch moment of the upward (nose-up) direction generated on the aircraft 1 is calculated by the calculation portion of the controller 8, for example, the operator 3 is pushed to a seat surface of the seat 11 by an inertial force. Accordingly, the sensitive pad 7 located at the lower projection portion (lower portion of the buttocks) of the operator 3 is vibrated so as to make the operator 3 who remote controls the aircraft 1 feel that the aircraft (own machine) 1 starts to nose up. On the contrary, when the pitch moment of the downward (nose-down) is calculated, the sensitive pads 7 located at the upper projection portion (upper portion of the left and right shoulders) of the operator 3 are vibrated so as to make the operator 3 feel that the own machine 1 starts to nose-down.

When the roll moment to the right is calculated, the operator 3 is pushed to the left side of the seat 11 by an inertial force. Accordingly, the sensitive pads 7 located at the left upper arm and the left shoulder of the operator 3 are vibrated so as to make the operator 3 feel that the own machine 1 starts to roll to the right. On the contrary, when the roll moment to the left is calculated, the sensitive pads 7 located at the right upper arm and the right shoulder of the operator 3 are vibrated so as to make the operator 3 feel that the own machine 1 starts to roll to the left. When the yaw moment to the right is calculated, the operator 3 is pushed to the left side of the seat 11 by an inertial force. Accordingly, the sensitive pad 7 located at the left upper arm of the operator 3 is vibrated so as to make the operator 3 feel that the own machine 1 starts rotating to the right in the yaw direction. On the contrary, when the yaw moment to the left is calculated, the sensitive pad 7 located at the right upper arm of the operator 3 is vibrated so as to make the operator 3 feel that the own machine 1 starts rotating to the left in the yaw direction.

When the three-axis gyro sensor is used as the acceleration sensor 6, it is preferred that a forward/backward acceleration sensor is separately mounted on the aircraft 1 so that the sensitive pads 7 located at the belly and the back of operator 3 are vibrated based on the output value of the forward/backward acceleration sensor to make the operator 3 feel the acceleration of the forward/backward directions. Note that the sensitive pads 7 can be controlled in the same way as in the case of the three-axis acceleration sensor by calculating the upward/downward, left/right and forward/backward accelerations (forces) generated on the cockpit 1a by the controller 8 based on the above described roll moment, pitch moment and yaw moment around the gravity center G of the cockpit 1a.

(Configuration of Sensitive Pad 7: Electrical Stimulation-Type)

Figure 8B:
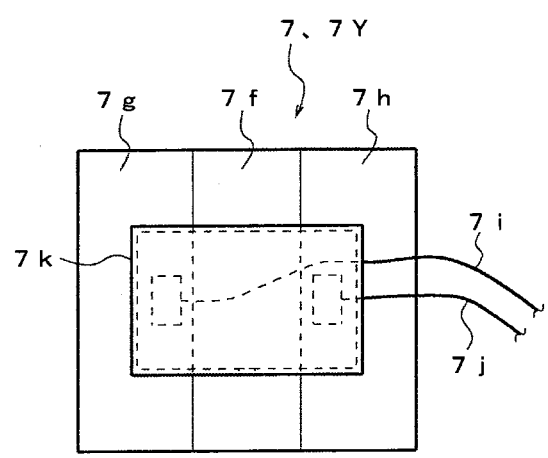
FIGS. 8A to 8C are explanation drawings showing a variation example (electrical stimulation-type) of the "sensitive pad.
Figure 8C:
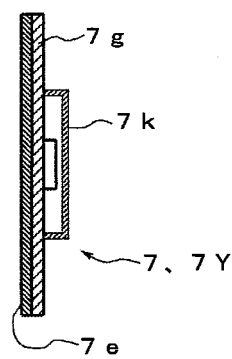
Figure 8A:
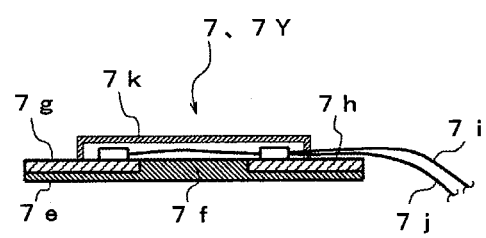

As shown in FIG. 1 and FIG. 4, an electrical stimulation-type can be used instead of the above described vibration-type as the sensitive pad 7 attached to each portion of the operator 3. FIGS. 8A to 8C show the configuration of the electrical stimulation-type sensitive pad 7Y. The electrical stimulation-type sensitive pad 7Y includes an insulating sheet 7e freely bendable along the surface of the body of the operator 3, a pair of mutually insulated positive electrode plate 7g and negative electrode 7h attached to the insulation sheet 7e and insulated by an insulation material, electrical wires 7i, 7j connected respectively to the positive electrode plate 7g and the negative electrode 7h via a terminal block, and a cover 7k to cover the terminal block. The insulation sheet 7e is detachably attached to a predetermined position of the operator 3 via a double-sided tape, MAGICTAPE (registered trademark) or the like.

When the sensitive pads 7Y are attached to the operator 3 and a pulse signal having a prescribed voltage is inputted to the positive electrode plate 7g and the negative electrode 7h, muscles between the positive electrode plate 7g and the negative electrode 7h are stimulated alternating contraction and relaxation. Thus, the operator 3 feels the electrical stimulus. The electrical stimulus felt by the operator 3 becomes large when the voltage of the pulse signal is increased, while electrical stimulus felt by the operator 3 becomes small when the voltage of the pulse signal is decreased. The acceleration generated on the flying aircraft 1 is simulated by the above described electrical stimulus.

Namely, the present embodiment makes the operator 3 feel a direction and a magnitude of the acceleration generated on the flying aircraft 1 as a tactile information by the presence or absence and the magnitude of the electrical stimulus of each of the sensitive pads 7Y attached to various portions of the operator 3.

Figure 9A:
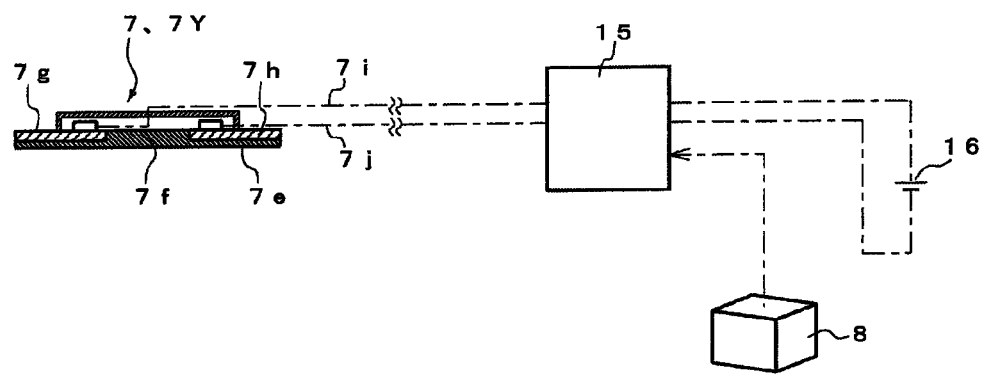
FIGS. 9A and 9B are explanation drawings for generating an electrical stimulus on the "sensitive pad.
Figure 9B:
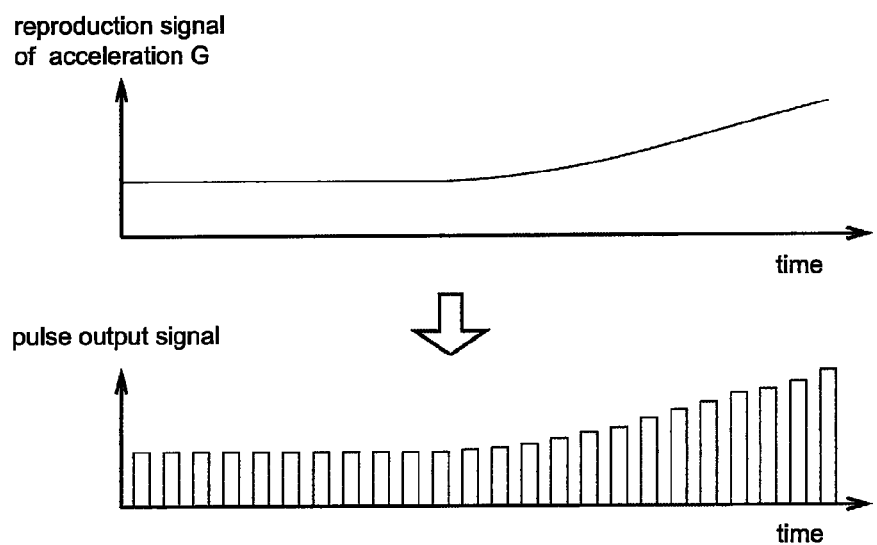

As shown in FIG. 9A, the positive electrode plate 7g and the negative electrode 7h of the sensitive pad 7Y are connected to a pulse controller 15, the pulse controller 15 is connected to a power source 16 for driving pulse, and the reproduction signal of acceleration G is input from the controller 8 to the pulse controller 15. As shown in FIG. 9B, the pulse controller 15 inputs the pulse signal (constant interval) having the voltage proportional to the magnitude of the reproduction signal of acceleration G to the positive electrode plate 7g and the negative electrode 7h of the sensitive pad 7Y. Note that the electrical stimulus felt by the operator 3 can be adjusted by changing a pulse interval of the pulse signal. In this case, the electrical stimulus becomes large when the pulse interval becomes short.

Although the electrical stimulation-type sensitive pad 7Y is different from the vibration-type sensitive pad 7X in a point that the method of making the operator 3 feel the acceleration is changed from the vibration to the electrical stimulus, the control performed by the controller 8 is same as the vibration-type sensitive pad 7X. Accordingly, the explanation of the control of each of the sensitive pads 7Y performed by the controller 8 is omitted.

(Operations and Effects)

As shown in FIG. 1 and FIG. 4, the remote control system for aircraft S of the present invention can make the operator 3 who is remote from the aircraft 1 feel the acceleration of various directions generated on the flying aircraft 1 as tactile information (vibration, electrical stimulus) in addition to the visual information captured by the camera 2. Thus, the operator 3 can realize the attitude and the flight direction of the aircraft (own machine) 1. Consequently, the operability is improved and the operator who is remote from the aircraft 1 can feel as if he/she operates the aircraft 1 while being on board the aircraft 1.

For example, when there are no clouds and nothing but blue sky on the sky flying the aircraft (own machine) 1, only blue color is displayed on the monitor. For example, when the own machine is entered into clouds, only gray color is displayed on the monitor 4. Thus, there is no scale (clue) to visually understand the attitude condition and the moving direction of the own machine 1 in the image displayed on the monitor 4. In these cases, the operator 3 cannot understand the present attitude and moving direction of the own machine 1 only from visual information input from the monitor 4, and therefore the operator 3 may not operate the aircraft 1 properly.

In the remote control system for aircraft S of the present embodiment, the sensitive pads 7 are attached to each portion of the operator 3, and the sensitive pads 7 are actuated at the portions where the operator 3 is pushed to the seat by the inertial force based on the acceleration of various directions generated on the flying aircraft 1. Thus, the operator 3 can easily recognize the flight attitude and the flight direction of the own machine 1 and the operability is improved. Assuming that the operator 3 is on board the aircraft 1, when the acceleration sensor 6 mounted on the aircraft 1 detects the upward acceleration or the pitch moment of the upward (nose-up), for example, the operator 3 is pushed to the seat surface of the seat 11 by an inertial force. Accordingly, the vibration or the electrical stimulus is generated on the sensitive pad 7 located at the lower projection portion (lower portion of the buttocks) of the operator 3 so as to make the operator 3 who remote controls the aircraft 1 feel that the own machine 1 starts to nose up and go upward.

As explained above, the operator 3 can judge the flight attitude and the flight direction of the own machine 1 by using the tactile information (vibration, electrical stimulus) of the sensitive pads 7 in addition to the visual information of the monitor 4. Consequently, the operability is improved and the operator 3 who is remote from the aircraft 1 can feel as if he/she operates the aircraft 1 while being on board the aircraft 1.

As the means of making the operator 3 feel the acceleration of various directions generated on the aircraft 1 as tactile information, the sensitive pads 7 attached respectively to the upper projection portion, the lower projection portion, the left projection portion, the right projection portion, the front projection portion, and the rear projection portion of the operator 3 are used and the acceleration is simulated by generating the vibration or the electrical stimulus on the sensitive pads 7 while the magnitude of the vibration or the electrical stimulus is changed at an appropriate timing. Accordingly, whole the system can be configured simply and at low cost when compared to the type (flight simulator type) of simulating the acceleration by tilting the sheet 11 of the operator 3 using the hydraulic cylinder.

In addition, as shown in FIG. 1 and FIG. 4, the front camera 2a, the right camera 2b, the left camera 2c and the upper camera 2d are mounted on the aircraft 1, and the moving images captured by these cameras are displayed on the front monitor 4a, the right monitor 4b, the left monitor 4c and the upper monitor 4d. Consequently, the operator 3 can recognize the visual field of the right, left and upper directions of the aircraft 1 in addition to the front direction. From the above, combined with the above described tactile information (vibration, electrical stimulus) of the sensitive pads 7, the operator 3 can feel as if he/she operates the aircraft 1 while on board the aircraft 1 and the operability can be improved.

Figure 10A:
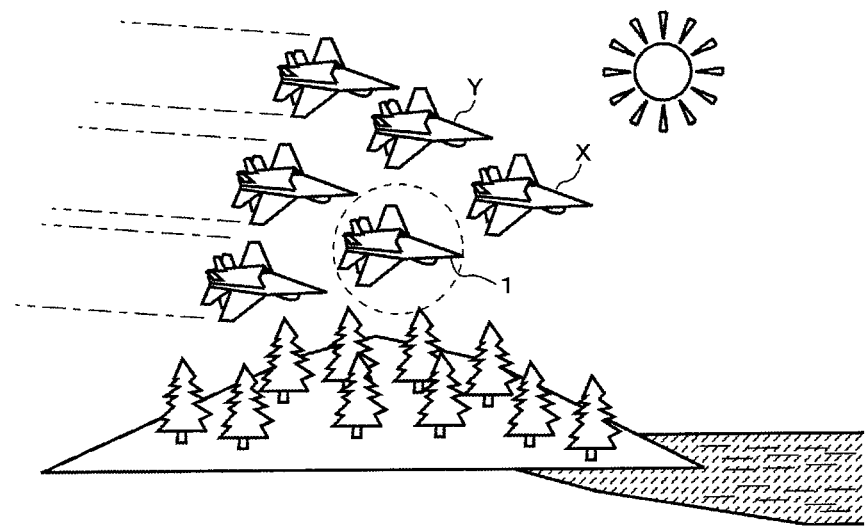
FIG. 10A is an explanation drawing showing a state that aerobatics are performed by a plurality of radio-controlled aircrafts to which the "remote control system for aircraft" is applied.
Figure 10B:
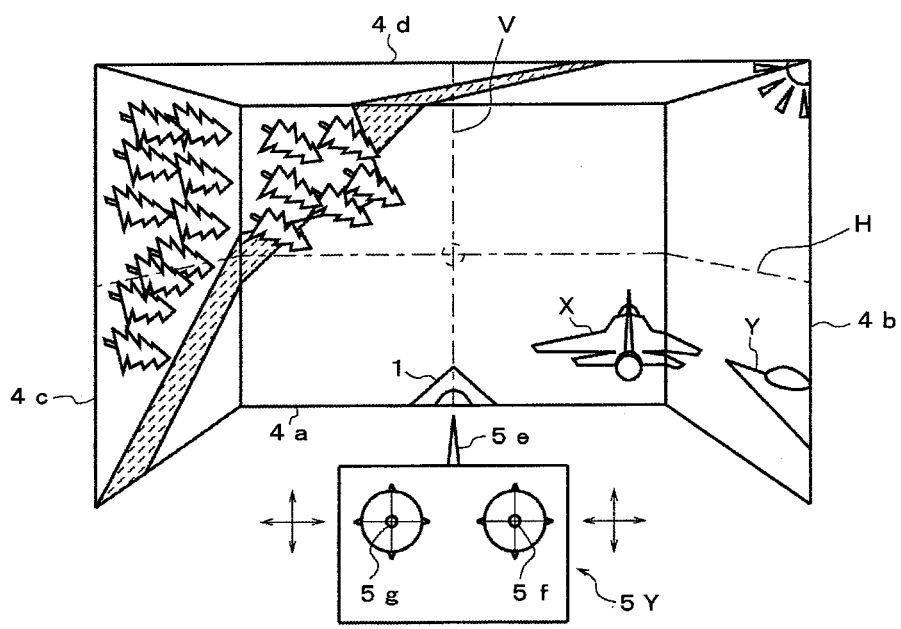
FIG. 10B is a drawing showing a visual image of the operator.

FIG. 10A is an explanation drawing showing a state that aerobatics are performed by a plurality of radio-controlled aircrafts 1 to which the above described "remote control system for aircraft" S is applied. FIG. 10B is a drawing showing a visual image of the operator 3 of one of the radio-controlled aircrafts 1 surrounded by a broken line in FIG. 10A. As shown in FIG. 10B, the first machine X is displayed on the right front of the own machine 1 in the front monitor 4a, the second machine Y is displayed on the right monitor 4b, and the horizon and the sun are displayed on the front monitor 4a, the right monitor 4b, the left monitor 4c and the upper monitor 4d in a inclined state according to the inclined flight attitude of the own machine 1. As a result, the operator 3 can obtain the visual information as if the operator 3 is on board the own machine 1. Thus, combined with the above described tactile information (vibration, electrical stimulus) of the sensitive pads 7, the operability is improved. In FIG. 10B, a virtual line H displayed in a horizontal direction in each of the monitors is a horizontal line with respect to the own machine 1, and a virtual line V displayed in a vertical direction is a vertical line with respect to the own machine 1. These virtual lines serve as the base line for judging the attitude of the own machine 1 with respect to the ground.

As shown in FIG. 10B, the orientation of the own machine 1 displayed in the monitor 4 is identical with the orientation of the proportional transmitter 5Y. Consequently, the operator 3 can easily operate the sticks 5g, 5f of the proportional transmitter 5Y. Namely, as shown in FIG. 10A, when the aerobatics are performed by a plurality of radio-controlled aircrafts including the own machine 1 using only a conventional proportional transmitter 5Y for the remote control, the operator 3 who operates the proportional transmitter 5Y on the ground should understand the flight direction, the flight attitude, the attack angle and the like of the flying radio-controlled aircraft (own machine) 1 by visual observation from the ground, and the operator 3 should momentarily judge the direction and amount of operating the sticks 5g, 5f of the proportional transmitter 5Y from the visual observation. In order to enable the above described operation, long time training is needed. In addition, if the operation of the sticks is delayed or mistaken, the own machine 1 may contact with the other machines or may fall. Accordingly, the formation flight and the aerobatics performed by a plurality of radio-controlled aircrafts are practically impossible in conventional.

On the contrary, when the "remote control system for aircraft" S of the present invention is used, as shown in FIG. 10B, the orientation of the own machine 1 displayed in the monitor 4 is identical with the orientation of the proportional transmitter 5Y, and the operator 3 can obtain the visual information as if the operator 3 is on board the own machine 1. Thus, the operation of the sticks of the proportional transmitter 5Y becomes easier, and the operator 3 can immediately operate the sticks 5g, 5f without hesitation based on the images displayed on the monitor 4. Accordingly, the formation flight and the aerobatics performed by a plurality of radio-controlled aircrafts become possible.

Figure 11:
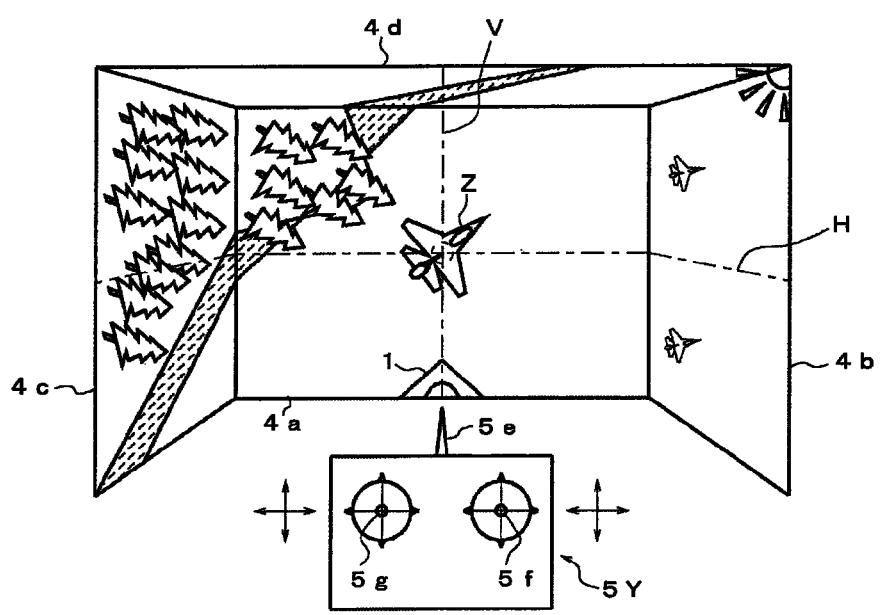
FIG. 11 is a drawing showing a visual image of the operator when dogfight is done by using a radio-controlled aircraft to which the "remote control system for aircraft" is applied.

FIG. 11 is a drawing showing a visual image of the operator 3 when air battle simulation (dogfight) is done by using a radio-controlled aircraft 1 to which the above described "remote control system for aircraft" is applied. As described above, the orientation of the own machine 1 displayed on the monitor 4 is identical with the orientation of the proportional transmitter 5Y, and the operator 3 can keep the front, side and upper visual fields required for the dogfight by using the front monitor 4a, the right monitor 4b, the left monitor 4c and the upper monitor 4d. Namely, even if an enemy aircraft Z is out of the display range of the front monitor 4a when the enemy aircraft Z turns, for example, the enemy aircraft Z can be displayed on either of the right monitor 4b, the left monitor 4c or the upper monitor 4d. Thus, the operator 3 does not lose sight of the enemy aircraft Z. In addition to the visual information input from the monitors 4a to 4d, the operator 3 can feel the acceleration G generated on the own machine 1 during the dogfight as the tactile information by the vibration or the electrical stimulus of each of the sensitive pads 7. Consequently, the operator 3 can operate the own machine 1 during the dogfight as if he/she operates the own machine 1 while being on board the own machine 1.

The preferable embodiments of the present invention is explained above with reference to the drawings. Of course, the present invention is not limited to the above described embodiments. It goes without saying that various variation examples and modification examples within the rage described in the claims are included in the technical scope of the present invention.

The present invention can be applied to the remote control system for aircraft that can make the operator who operates the aircraft from the remote location feel as if he/she operates the aircraft while on board the aircraft.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A remote control system for an aircraft, comprising:
a camera mounted on the aircraft to capture at least a front in a flight direction;
a monitor to display a moving image captured by the camera, the monitor being arranged at a position visible from an operator who controls the aircraft from a location remote from the aircraft;
a remote controller operated by the operator viewing the monitor, the remote controller controlling a flight direction and a flight speed of the aircraft according to an operation of the operator;
an acceleration sensor mounted on the aircraft to detect upward and downward, left and right, and forward and backward accelerations generated on the flying aircraft;
sensitive pads configured to be attached to each of an upper projection portion, a lower projection portion, a left projection portion, a right projection portion, a front projection portion, and a rear projection portion of the operator; and
a controller that generates a vibration or an electrical stimulus on the sensitive pads while a magnitude of the vibration or the electrical stimulus is changed based on an output value of the acceleration sensor to indicate a direction to the operator and a magnitude of the acceleration generated on the aircraft,
wherein
the controller actuates the sensitive pad located at the lower projection portion when the acceleration sensor detects the upward acceleration and actuates the sensitive pad located at the upper projection portion when the acceleration sensor detects the downward acceleration,
the controller actuates the sensitive pad located at the right projection portion when the acceleration sensor detects the left acceleration and actuates the sensitive pad located at the left projection portion when the acceleration sensor detects the right acceleration, and
the controller actuates the sensitive pad located at the rear projection portion when the acceleration sensor detects the forward acceleration and actuates the sensitive pad located at the front projection portion when the acceleration sensor detects the backward acceleration.

2. The remote control system for the aircraft according to claim 1, wherein
the acceleration sensor includes an angular acceleration sensor provided inside the aircraft, and
the controller includes a calculation portion that calculates a moment of force generated at a cockpit position by multiplying an angular acceleration detected by the angular acceleration sensor on a distance between a position of the angular acceleration sensor and the cockpit position of the aircraft to adjust a magnitude of the vibration or the electrical stimulus of the sensitive pads according to the moment calculated by the calculation portion.

3. The remote control system for the aircraft according to claim 1, wherein
the camera includes a front camera that captures the front in the flight direction, a right camera that captures a right in the flight direction, a left camera that captures a left in the flight direction, and an upper camera that captures an upper side in the flight direction, and
the monitor includes a front monitor that is arranged at a front of the operator to display the moving image captured by the front camera, a right monitor that is arranged at a right of the operator to display the image captured by the right camera, a left monitor that is arranged at a left of the operator to display the moving image captured by the left camera, and an upper monitor that is arranged at an upper side of the operator to display the moving image captured by the upper camera.

* * * * *